May 31, 1960 W. F. BERCK 2,938,531
AIR ELIMINATOR VALVE AND FLOAT THEREFOR
Filed Dec. 30, 1957 2 Sheets-Sheet 1
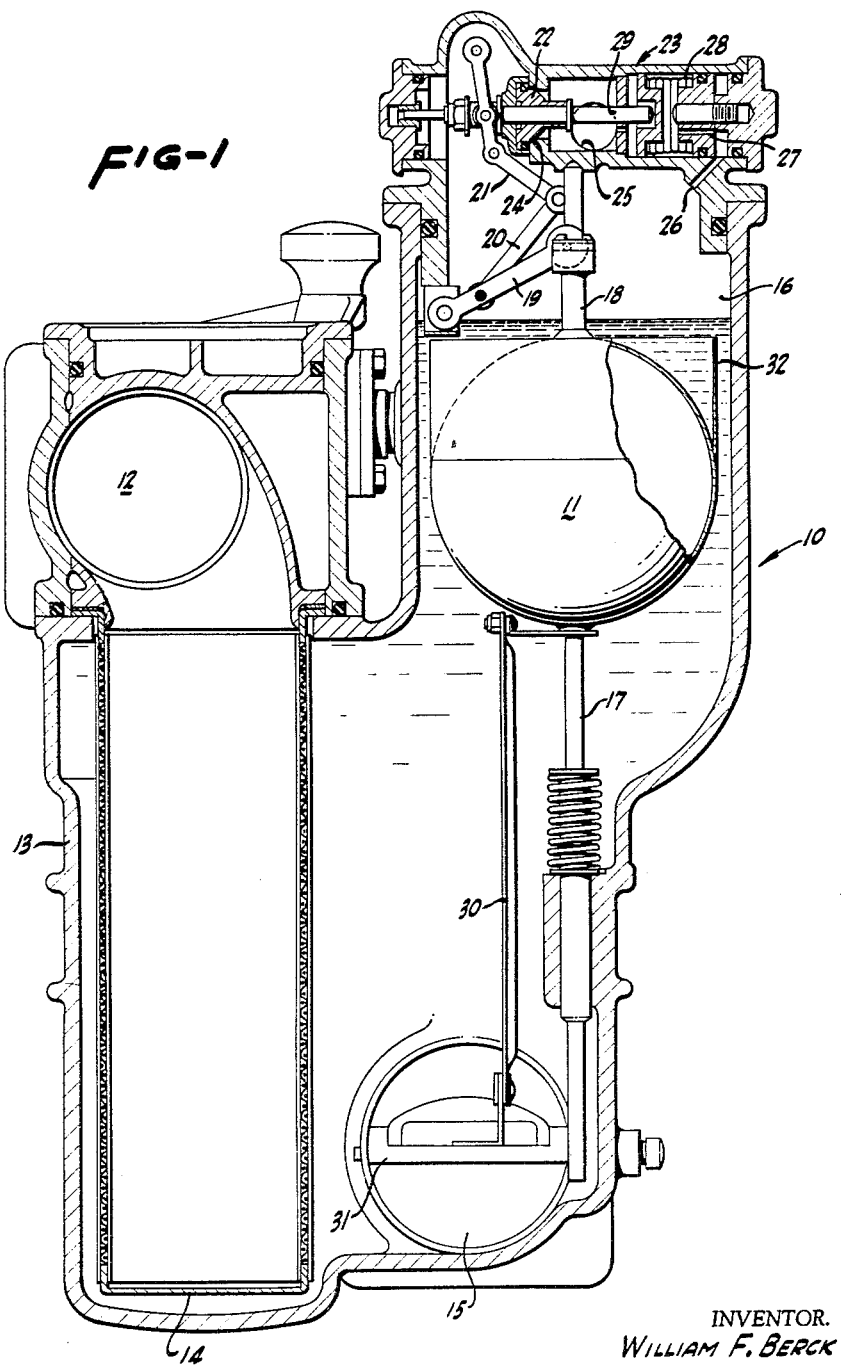
INVENTOR.
WILLIAM F. BERCK
BY
Mellin and Hanscom
ATTORNEYS

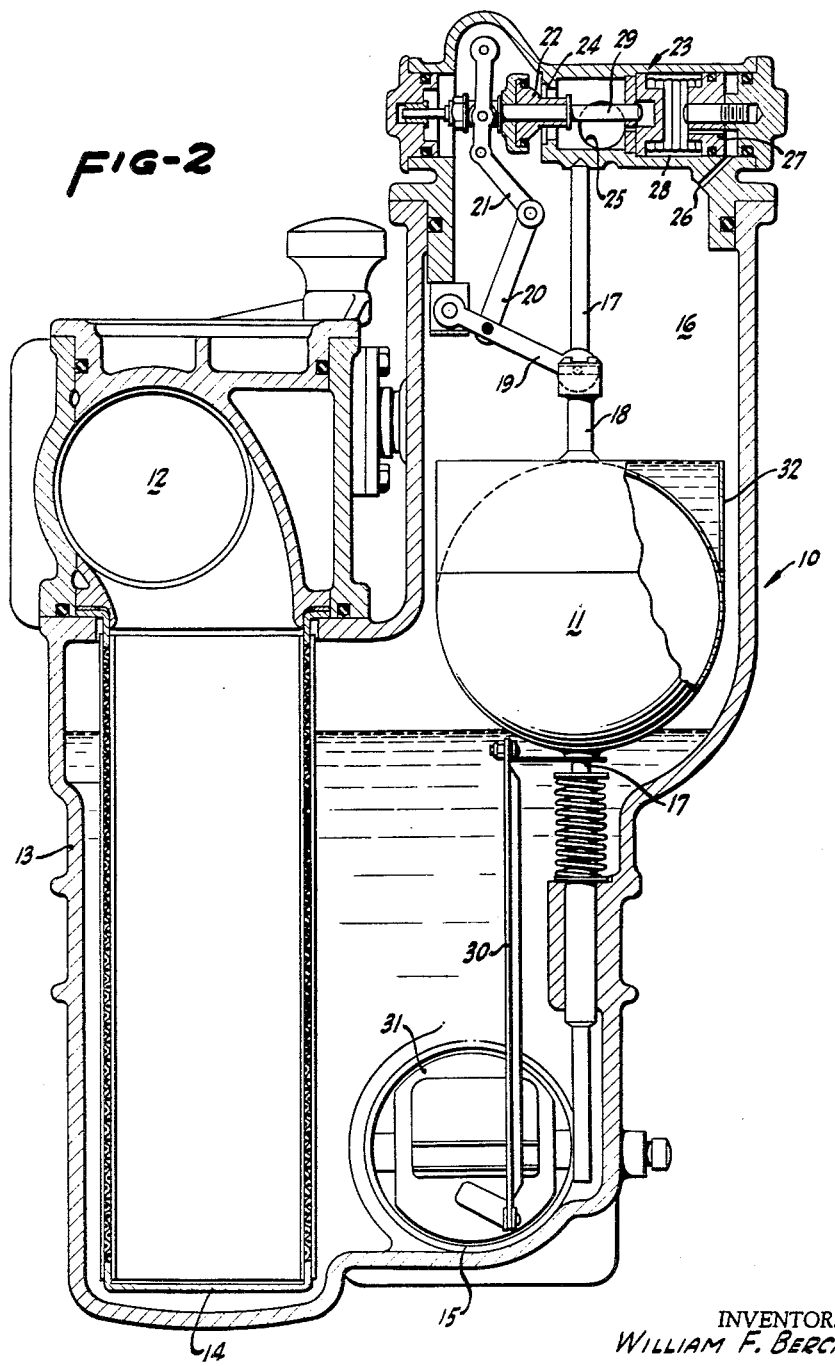

United States Patent Office

2,938,531
Patented May 31, 1960

2,938,531
AIR ELIMINATOR VALVE AND FLOAT THEREFOR

William F. Berck, Hayward, Calif., assignor to Ralph N. Brodie Company, San Leandro, Calif., a corporation of California Filed Dec. 30, 1957, Ser. No. 705,963

2 Claims. (Cl. 137—174)

This invention relates to an air eliminator valve apparatus, and, more specifically, to an improved float member therefor.

In my prior patent, U.S. No. 2,745,511, I have described a balanced poppet air eliminator valve of the type used in fluid metering operations where it is important to remove entrained air so that an accurate measurement may be made of the fluid actually delivered through a pipe line. One important example of such use is in the bulk delivery of fuel products by tank trucks to underground storage tanks.

Recent developments in the design of tank trucks have increased the problems of air separation and elimination. Higher speeds of delivery and larger delivery lines have greatly increased the amounts of air entrained in the discharging liquid which must be separated and discharged from the fluid before it is metered.

In a typical operation, a tank truck discharges its contents through appropriate pipes and valves, and through a flow meter to underground storage. When a full tank is first opened, a rush of liquid combines with the air in the empty pipes and the flow through the pipes changes from air alone to air plus liquid, with the mixture increasing to liquid plus air until finally the flow is entirely liquid.

As the liquid level in the tank lowers, a vortex forms at the discharge orifice, and increasing quantities of air are drawn into the discharge pipe until the tank is drained. During this period, the flow changes rapidly from liquid alone to liquid plus air, then to air plus liquid, and finally to air alone.

During these transition periods from air alone to liquid alone, or vice versa, the float chamber of the air eliminator valve is at times filled with a heavy foam of sufficient density as to cause the float to be buoyant at the exact time when it should lose buoyancy and open the discharge valve to vent the air or air foam mixture.

To overcome this problem, I have provided a novel design of the float in the air eliminator valve so that it will actuate the valve in a rapid and positive manner even though the float chamber be filled with a heavy air-liquid foam, thus enabling the valve to discharge more air in a shorter period of time. This has been accomplished by designing the float so that the major portion of its effective weight is comprised by the liquid in the float chamber.

A primary object of the invention is to provide an air eliminator apparatus for separating and eliminating air entrained in a liquid comprising a housing having an inlet and outlet for said liquid, an air trap chamber above said inlet and outlet, an air relief valve venting said air trap chamber, a float member in said air trap chamber, linkage means connecting said valve and float for operating said valve in response to vertical movement of said float, and in which said float member has the major portion of its effective weight comprised by said liquid.

Another object is to provide for use in a housing having a liquid level rising and falling therein, a float member having the major portion of its effective weight comprised by said liquid.

Still another object of the invention is to provide for use in a housing having a liquid level rising and falling therein, a float member, and a skirt mounted on and extending upwardly around said float member to form an open topped and closed bottom liquid entrapping enclosure with said float member.

Other objects and advantages will become apparent in the course of the following detailed description.

In the drawings, forming a part of this application, and in which like parts are referred to by like reference numerals throughout the same, Fig. 1 is a vertical sectional view through an air eliminator assembly embodying the principles of my invention, and with the air relief valve shown in its closed position.

Fig. 2 is a view similar to Fig. 1, and showing the air relief valve in its open position.

Referring now to the drawings, the air eliminator, generally indicated at 10, is identical to the air eliminator shown in my prior Patent No. 2,745,511, with the exception of the float member 11. As most of the structure of the air eliminator and the operation thereof is identical to that fully shown and described in my above mentioned patent, it is thought sufficient for the purpose of this invention to merely describe the general operation of the apparatus.

Liquid from a tank truck passes through a fluid line (not shown) and enters inlet 12 in housing 13, passes through a screen 14, and flows out the outlet 15 into a fluid meter (not shown). In passing through the housing, any air entrained in the liquid rises to collect in the air trap chamber 16, located above the inlet 12 and outlet 15 of the housing.

The float 11 is mounted on a rod 17 for vertical movement within the air trap chamber, and has fixed at its upper end a bracket 18, engaging the lever 19. The levers 19, 20 and 21 comprise a linkage means, connecting the float member 11 with the valve member 22 of the balanced air relief valve 23. As shown in Fig. 2, when the float member 11 is in its lowest position, the linkage means 19, 20 and 21 act to move the valve member 22 away from valve seat 24, so that the air trapped in the air trap chamber 16 may flow through the valve seat and out the air vent 25 to atmosphere. When the float member 11 moves upwardly to its upper limit, as shown in Fig. 1, the linkage means closes the valve member 22 onto valve seat 24 to prevent further venting.

The air in the air trap chamber 16 may pass at all times through passages 26 and 27 into the interior of the bellows 28 to provide a balancing force on the valve stem 29, so that the valve member 22 may be easily opened, regardless of the pressure within the air trap chamber.

A link 30 mounted for vertical movement with the float 11 acts to close the butterfly valve 31 in the liquid outlet 15 when the float member is in its lowest position, and to open the butterfly valve 31 when the float is in its upper position.

The float 11 has an upwardly extending skirt 32 fixed on the upper surface of the float, and extending around the float to form an open topped enclosure for the float. This skirt is imperforate so that any liquid entrapped therein cannot run out of the skirt. As is obvious, the upper surface of the float forms the closed bottom for this liquid entrapping enclosure.

When liquid is first introduced into the device 10, the float 11 will be in its lower position, as shown in Fig. 2, with the air relief valve 23 open and the butterfly valve 31 closed. The liquid level will rise in the air trap chamber 16, carrying the float upwardly with it until the float reaches the position shown in Fig. 1, at which time the relief valve 23 will close, leaving air at atmospheric pressure in the top of the chamber 16. Since the liquid is under pressure, the liquid level will continue to rise to the level shown in Fig. 1 and a portion thereof will overflow the top of skirt 32 to be trapped therein.

As liquid continues to flow through the meter, entrained air will separate out and collect in chamber 16, causing the liquid level therein to drop until the float falls therewith sufficiently to allow the air relief valve 23 to open. The entrapped air is quickly discharged and the liquid level and float rise to again close the air relief valve.

The significance of the liquid entrapping skirt on the float lies chiefly in the fact that with this construction, the effective weight of the float is increased without affecting the buoyancy of the float. When the liquid level is above the float skirt, as in Fig. 1, the liquid entrapped within this skirt is of the same specific gravity as the remainder of the liquid, and consequently does not affect the buoyancy of the float.

If the character of the main body of liquid in the device were to change from substantially all liquid to a heavy foam, the float might not have sufficient weight by itself to sink through the foam, and the air valve 23 would remain closed, just at the time that it is essential that it be opened. However, such a change of character would not affect the liquid trapped within the float skirt, and the weight of this liquid will cause the float to sink through the foam, thus opening the air relief valve and closing the butterfly valve 31 as is desired.

This construction is also advantageous even if, in the cycle of operation, the character of the liquid does not change. As soon as the liquid level in the chamber 16 falls below the liquid level in the skirt 32, the entrapped liquid adds to the weight of the float and causes it to lose buoyancy at a faster rate than a standard float.

In the two operating conditions above, the increased effective weight of the float causes faster and more positive action of the float for descending liquid levels.

Upon the re-rising of the liquid level, the level will rise to the top of the skirt 32 such that the liquid levels in both the chamber 16 and the skirt 32 will be equal. Since the liquids have the same specific gravity, the effective weight of the float is that of the float alone, and the buoyancy of the float alone will cause it to quickly rise with the rising liquid level.

The float 11 and skirt 32 are constructed so that the weight of the float and skirt alone are a minor portion of the total weight of the float, skirt and liquid trapped within the skirt. In this manner, the float will have its major portion of effective weight comprised of the fluid in the device 10, thus assuring that the float will have approximately the same buoyancy regardless of the specific gravity of the fluid, such that no adjustment is needed if the device is to be used with a different liquid. Heretofore, floats had to be specially weighted in relation to the specific gravity of each fluid in which they were used.

Although the skirt 32 is shown as being fixed to the upper surface of the float 11, essentially the same results could be obtained if the skirt were formed as a saucer fixed to and extending around the bottom surface of the float, to entrap liquid at the lower surface of the float. However, it is preferable that the entrapped liquid be carried on the float at a high level thereon, as long as the top of the skirt will not rise above the uppermost liquid level reached in the device.

It is to be understood that the form of the invention, herewith shown and described, is to be taken as a preferred embodiment of the same, and that various changes in the shape, size and arrangement of parts may be resorted to without departing from the spirit of my invention or the scope of the attached claims.

Having thus described my invention, what I claim and desire to secure by Letters Patent is:

1. An air eliminator apparatus for separating and eliminating air entrained in a liquid comprising a housing having an inlet and outlet for said liquid, an air trap chamber above said inlet and outlet, an air relief valve venting said air trap chamber, a float member in said air trap chamber, linkage means connecting said valve and float for operating said valve in response to vertical movement of said float, an imperforate open topped container means fixed on said float member for entrapping a portion of said liquid with said float member, and means limiting upward vertical movement of said float so that the open top of said container will be below the liquid level in said air trap chamber when said air relief valve is closed.

2. An air eliminator apparatus for separating and eliminating air entrained in a liquid comprising a housing having an inlet and outlet for said liquid, an air trap chamber above said inlet and outlet, an air relief valve venting said air trap chamber, a float member in said air trap chamber, linkage means connecting said valve and float for operating said valve in response to vertical movement of said float, an imperforate skirt mounted on and extending upwardly from around said float member to form an open topped and closed bottom liquid entrapping enclosure with said float member, and means for limiting upward vertical movement of said float in said air chamber so that the open top of said enclosure is below the liquid level in said chamber when said air relief valve is closed.

References Cited in the file of this patent

UNITED STATES PATENTS

| | | |
|---|---|---|
| 513,474 | Bate | Jan. 30, 1894 |
| 576,790 | O'Brien | Feb. 9, 1897 |
| 2,564,305 | Hicks | Aug. 14, 1951 |
| 2,687,142 | Law | Aug. 24, 1954 |
| 2,745,511 | Berck | May 15, 1956 |